United States Patent
Blasco et al.

(10) Patent No.: US 10,175,982 B1
(45) Date of Patent: Jan. 8, 2019

(54) STORING TAKEN BRANCH INFORMATION

(71) Applicant: Apple Inc., Cupertino, CA (US)

(72) Inventors: Conrado Blasco, Sunnyvale, CA (US); Ian D. Kountanis, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 217 days.

(21) Appl. No.: 15/184,308

(22) Filed: Jun. 16, 2016

(51) Int. Cl.
*G06F 9/30* (2018.01)
*G06F 9/38* (2018.01)

(52) U.S. Cl.
CPC ........ *G06F 9/30058* (2013.01); *G06F 9/3802* (2013.01)

(58) Field of Classification Search
None
See application file for complete search history.

(56) References Cited

U.S. PATENT DOCUMENTS

| | | | |
|---|---|---|---|
| 7,278,012 B2 * | 10/2007 | Sartorius | G06F 9/3844 712/240 |
| 7,409,535 B2 | 8/2008 | Park et al. | |
| 2003/0182543 A1 * | 9/2003 | Keller | G06F 9/30149 712/237 |
| 2005/0228977 A1 * | 10/2005 | Cypher | G06F 9/3846 712/240 |
| 2010/0064123 A1 * | 3/2010 | Zuraski, Jr. | G06F 9/3806 712/239 |
| 2014/0089647 A1 * | 3/2014 | Kountanis | G06F 9/38 712/240 |
| 2014/0297996 A1 * | 10/2014 | Jayaseelan | G06F 9/3848 712/239 |
| 2015/0046690 A1 * | 2/2015 | Eickemeyer | G06F 9/3844 712/239 |
| 2015/0046691 A1 | 2/2015 | Heil et al. | |
| 2015/0331691 A1 * | 11/2015 | Levitan | G06F 9/30058 712/240 |
| 2015/0363204 A1 * | 12/2015 | Bonanno | G06F 9/3806 712/240 |
| 2016/0026470 A1 * | 1/2016 | Manoukian | G06F 9/3848 712/240 |
| 2016/0139932 A1 * | 5/2016 | Carlson | G06F 9/3844 712/240 |
| 2016/0210154 A1 * | 7/2016 | Lin | G06F 9/38 |

\* cited by examiner

*Primary Examiner* — Eric Coleman
(74) *Attorney, Agent, or Firm* — Meyertons, Hood, Kivlin, Kowert & Goetzel, P.C.

(57) ABSTRACT

A method and system for storing branch information is disclosed. First data may be stored in a first entry of a first table in response to a determination that a fetched instruction is a branch instruction. Second data that is dependent upon at least one previously taken branch may be stored in a second entry in a second table in response to a determination that a branch associated with the instruction is predicted to be taken. The first data may be updated to include an index to the second data in response to the determination that the branch is predicted to be taken.

20 Claims, 7 Drawing Sheets

| Slice | Field | Comments | |
|---|---|---|---|
| 0 | TBITTIDX | tBIT index for branch | For all branches |
| 0 | BDPADDRLO | Branch Address [5:2] | |
| 0 | BDPTAKEN | Branch predicted taken | |
| 0 | WRAP | BIT index wrap bit | |
| 1 | BSPADDRHI | Branch address [26:6] | BDP branches only |
| 1 | BDPUPDU | Branch will update BPD U bit | |

FIG. 4

| Slice | Field | Comments | |
|---|---|---|---|
| 0 | BTPHITIDX | BTP hit table index | For BTP branches only (shared with BIT slice 1) |
| 0 | BTPUBITS | U-bits for BTP tables 1-6 | |
| 0 | BTPCTRBITS | Ctr bit for BTP hit table | |
| 0 | BTPBRNFGPC | Fetch group PC for BTP branch | |
| 1 | BDPGHIST | BDP GHIST vector | For all branches |
| 1 | BDPPHIST | BDP PHIST vector | |
| 2 | RASPUSH | RAS push branch | For calls and returns only |
| 2 | RASPOP | RAS pop branch | |
| 2 | RASAGE | Age of RAS branch | |
| 2 | RASOPPTR | RAS pop pointer | |

STORING TAKEN BRANCH INFORMATION

BACKGROUND

Technical Field

Embodiments described herein relate to processors or processor cores, and more particularly, to techniques for branch prediction.

Description of the Related Art

Computing systems may include one or more systems-on-a-chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

To implement the desired functions on an SoC, one or more processors may be employed. Each processor may retrieve program instructions from memory (commonly referred to as an "instruction fetch"). When fetching such program instructions, a processor may check a hierarchy of local or cache memories for the desired instruction. If the instruction is not available in the hierarchy of local of cache memories, the processor may issue a request to retrieve the desired instruction from main memory or other storage such as, a CD-ROM, or a hard drive, for example.

Each fetched instruction may cause the processor to perform different functions. Some instructions cause the processor to perform arithmetic or logical operations on one or more operands. Other instructions may cause the processor to load data from or store data to a memory or other storage device, while some instructions may cause the processor to change a location from which a subsequent instruction will be fetched.

SUMMARY OF THE EMBODIMENTS

Various embodiments of a computing system are disclosed. Broadly speaking, a system may include circuitry configured to store first data in a first entry of a first plurality of entries in a first memory in response to a determination that an instruction is a branch instruction. The circuitry may be further configured to store second data that is dependent upon at least one previously taken branch in a second entry in a second plurality of entries in a second memory in response to a determination that a prediction indicates that a branch associated with the instruction will be taken. The first data may be updated by the circuitry to include an index to the second entry in response to the determination that the prediction indicates the branch will be taken.

In one embodiment, the circuitry may be further configured to store third data in third entry of the second plurality of entries in response to a determination that, upon execution, the branch associated with the instruction is taken and a determination that the prediction indicates that the instruction would not be taken.

In a further embodiment, the circuitry may be further configured to retrieve the second data from the second entry in response to a determination that, upon execution, the branch associated with the instruction is not taken and the determination that the prediction indicates that the branch associated with the instruction would be taken.

BRIEF DESCRIPTION OF THE DRAWINGS

The following detailed description makes reference to the accompanying drawings, which are now briefly described.

FIG. 4 illustrates a table depicting information stored in a Branch Information Table.

FIG. 5 illustrates a table depicting information stored in a taken Branch Information Table.

Figure 1:
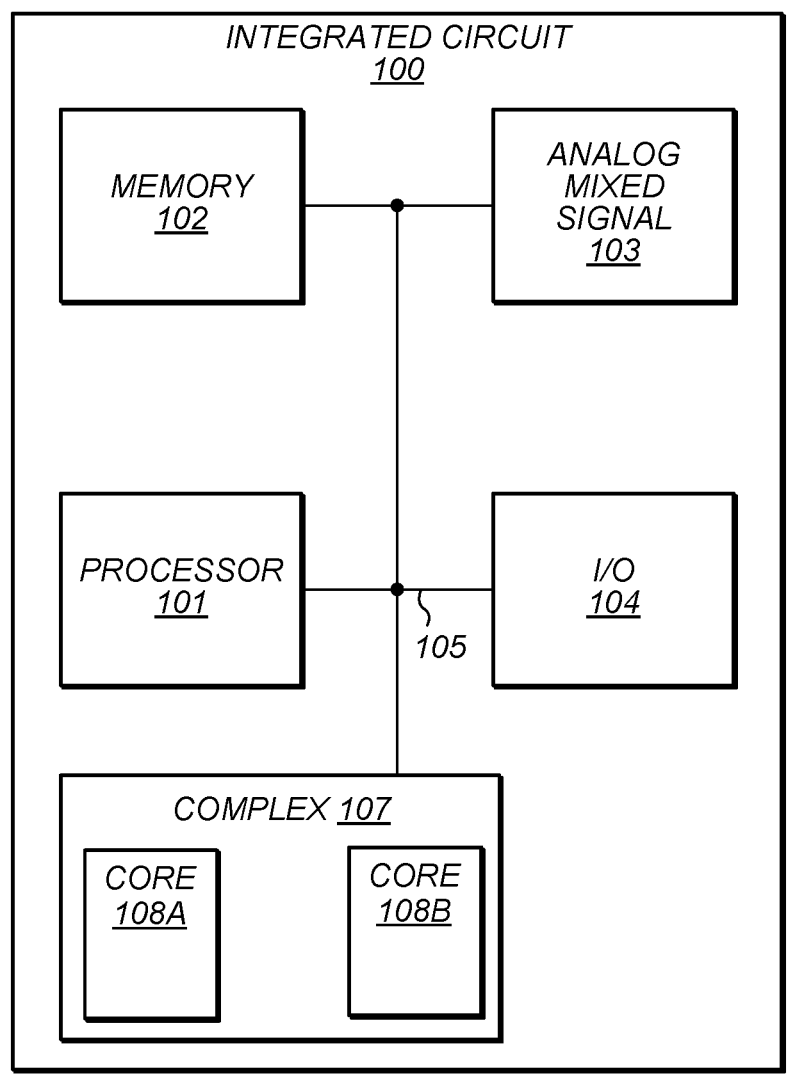
FIG. 1 illustrates an embodiment of an integrated circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Some instructions executed by a processor or processor core may affect a location from where subsequent instructions may be fetched. Such instructions are commonly referred to as branch instructions. Some branch instructions unconditionally change the program flow, while other branch instructions affect the program flow dependent upon a conditional.

Each time a conditional branch instruction is encountered, the processor or processor core may attempt to predict whether or not the branch will be taken (commonly referred to as "branch prediction"). Such predictions may be made based on a history of previous branch instructions and whether their associated branches were taken or not taken.

Once a prediction has been made, the processor or processing core may begin to fetch instructions from along the predicted path (either the original path or the branch path depending on the prediction). While the speculative fetching is occurring, the branch instruction is continuing through the processor or processing core to the execution unit, where it is finally evaluated and the actual outcome of the conditional is determined. If the prediction was correct, then no further action may be needed. If, however, the prediction was incorrect, i.e., a misprediction, then speculatively fetched, and possibly executed instructions, need to be discarded, and instructions fetched from the correct program path.

Following a misprediction, it is desirable to have information regarding the branch instruction in order to determine from which location in memory to begin fetching instructions along the correct path. Such information may include branch history up to the point of a particular branch instruction, branch address information, and the like. Storing such data may require large amounts of storage space. The embodiments illustrated in the drawings and described below may provide techniques for storing branch information while limiting the overall storage requirements in order to save area and power.

A block diagram of an integrated circuit including multiple functional units is illustrated in FIG. 1. In the illustrated embodiment, the integrated circuit 100 includes a processor 101, and a processor complex (or simply a "complex") 107 coupled to memory block 102, and analog/mixed-signal block 103, and I/O block 104 through internal bus 105. In various embodiments, integrated circuit 100 may be configured for use in a desktop computer, server, or in a mobile computing application such as, e.g., a tablet or laptop computer.

An embodiment of a computing system that may prefetch instructions along a predicted path is illustrated in FIG. 1. As described below in more detail, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA).

Complex 107 includes processor cores 108A and 108B. Each of processor cores 108A and 108B may be representative of a general-purpose processor configured to execute software instructions in order to perform one or more computational operations. Processor cores 108A and 108B may be designed in accordance with one of various design styles and may include one or more cache memories. In various embodiments, coherency may be maintained across cache memories included in processor cores 108A and 108B. It is noted that although only two processor cores are depicted in complex 107, in other embodiments, any suitable number of processor cores.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 1, a single memory block is depicted. In other embodiments, any suitable number of memory blocks may be employed.

In some cases, Memory block 102 may store a copy of data also stored in cache memories included in processor cores 108A and 108B. In various embodiments, multiple copies of particular data items may be maintained according to a coherency protocol such as, MOESI, for example. Coherent requests and corresponding responses (collectively "transactions" may be transmitted via bus 105). In other embodiments, additional busses connecting different circuit blocks may be employed. Such additional busses may only support non-coherent commands.

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with wireless networks.

I/O block 104 may be configured to coordinate data transfer between integrated circuit 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between integrated circuit 100 and one or more devices (e.g., other computer systems or integrated circuits) coupled to integrated circuit 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

It is noted that the embodiment illustrated in FIG. 1 is merely an example. In other embodiments, different functional units, and different arrangements of functional units may be employed.

Figure 2:
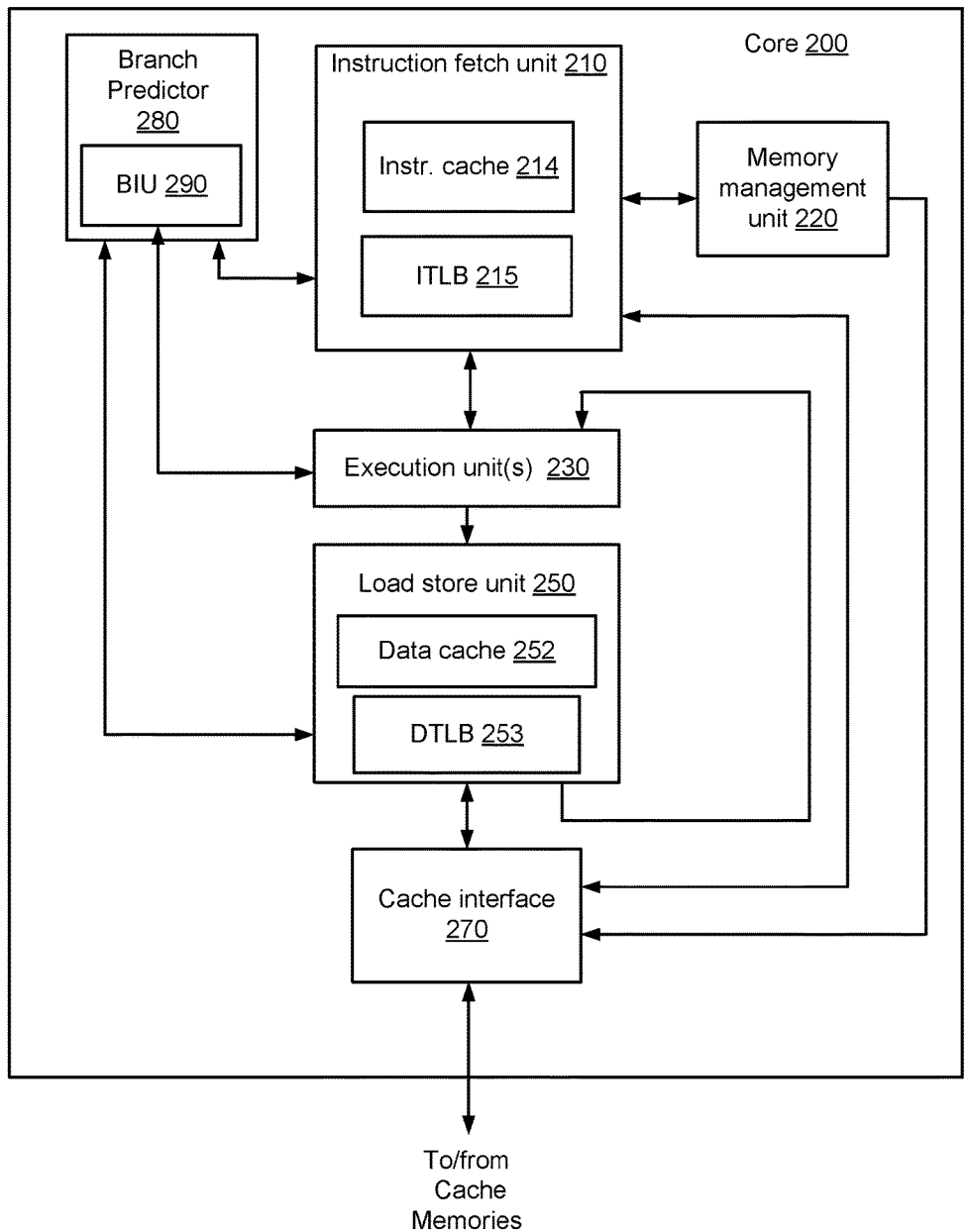
FIG. 2 illustrates a block diagram of an embodiment of a processor core.

A possible embodiment of a cores 108*a-b* is illustrated in FIG. 2. In the illustrated embodiment, core 200 includes an Instruction Fetch Unit (IFU) 210 coupled to a Memory Management Unit (MMU) 220, a Cache Interface 270, Branch Predictor 280, and one or more of Execution Units 230. Execution unit(s) 230 is coupled to Load Store Unit (LSU) 250, which is also coupled to send data back to each of execution unit(s) 230. Additionally, LSU 250 is coupled to cache interface 270, which may in turn be coupled to on-chip network, such as internal bus 105 as shown in FIG. 1, for example.

Instruction Fetch Unit 210 may be configured to provide instructions to the rest of core 200 for execution. In the illustrated embodiment, IFU 210 may be configured to perform various operations relating to the fetching of instructions from cache or memory, the selection of instructions from various threads for execution, and the decoding of such instructions prior to issuing the instructions to various functional units for execution. Instruction Fetch Unit 210 further includes an Instruction Cache 214. In one embodiment, IFU 210 may include logic to maintain fetch addresses (e.g., derived from program counters) corresponding to each thread being executed by core 200, and to coordinate the retrieval of instructions from Instruction Cache 214 according to those fetch addresses. Additionally, in some embodiments IFU 210 may include a portion of a map of virtual instruction addresses to physical addresses. The portion of the map may be stored in an Instruction Translation Lookaside Buffer (ITLB), such as ITLB 215, for example. In the case of a branch misprediction, IFU 210 may fetch some instructions based on data received from Branch Predictor 280.

Branch Predictor 280 is coupled to IFU 210 and may be configured to determine instructions to fetch into Instruction Cache 210 in response to detecting branch instruction. As used and described herein, a branch instruction is an instruction which may affect a location from which subsequent instructions are fetched. Branch Predictor 280 may predict if a branch included in a particular branch instruction will be taken or not taken. In response to the prediction made my Branch Predictor 280, IFU 210 may fetch instructions along the program path indicated by whether the branch was predicted as being taken or not taken. In various embodiments, Branch Predictor 280 includes Branch Instruction Unit (BIU) 290. As described below, in more detail, BIU 290 may be configured to store information relating to branch instructions. Once Execution unit(s) 230 have executed a particular branch instruction, it may be determined if the prediction regarding the particular branch instruction was correct. In the event that the prediction was incorrect, information stored in BIU 290 may be used to reset IFU 210 so that instructions along the correct program path may be fetched.

Execution Unit 230 may be configured to execute and provide results for certain types of instructions issued from IFU 210. In one embodiment, Execution Unit 230 may be configured to execute certain integer-type and floating-point instructions defined in the implemented ISA, such as arithmetic, logical, and shift instructions. It is contemplated that in some embodiments, core 200 may include more than one execution unit, and each of the execution units may or may not be symmetric in functionality.

Load Store Unit 250 may be configured to process data memory references, such as integer and floating-point load and store instructions. In some embodiments, LSU 250 may also be configured to assist in the processing of Instruction Cache 214 misses originating from IFU 210. LSU 250 includes Data Cache 352 as well as logic configured to detect cache misses and to responsively request data from a particular cache memory via Cache Interface 270. In one embodiment, Data Cache 252 may be configured as a write-through cache in which all stores are written to a particular cache memory regardless of whether they hit in Data Cache 252. In other embodiments, Data Cache 252 may be implemented as a write-back cache.

In one embodiment, LSU 250 may include a miss queue configured to store records of pending memory accesses that have missed in Data Cache 252 such that additional memory accesses targeting memory addresses for which a miss is pending may not generate additional cache request traffic. In the illustrated embodiment, address generation for a load/store instruction may be performed by one of Execution Unit(s) 230. Depending on the addressing mode specified by the instruction, one of Execution Unit(s) 230 may perform arithmetic (such as adding an index value to a base value, for example) to yield the desired address. Additionally, in some embodiments LSU 250 may include logic configured to translate virtual data addresses generated by Execution Unit(s) 230 to physical addresses. For example, in the present embodiment, LSU 250 includes a Data Translation Lookaside Buffer (DTLB) 253.

It is noted that the embodiment illustrated in FIG. 2 is merely an example and that some circuit blocks have been omitted for clarity. In other embodiments, different numbers of circuit blocks and different arrangements of circuit blocks may be employed.

Figure 3:
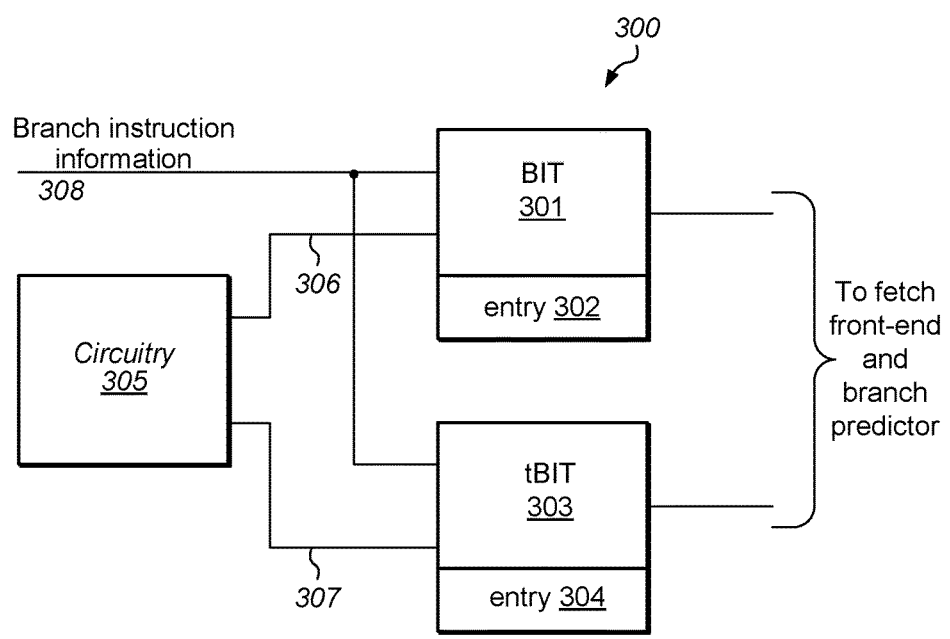
FIG. 3 illustrates a block diagram depicting an embodiment of a Branch Information Unit.

Turning to FIG. 3, an embodiment of a Branch Information Unit is illustrated. In the illustrated embodiment, BIUt 300 may correspond to BIU 290 as depicted in the embodiment illustrated in FIG. 2. BIU 300 includes, Branch Information Table (BIT) 301, taken Branch Information Table (tBIT) 303, and Circuitry 305 coupled to both BIT 301 and tBIT 303.

BIT 301 may include multiple entries, such as, entry 302, for example. In some embodiments, BIT 301 may include 60 entries. As described below in more detail, portions of Branch instruction information 308 may be stored in a particular entry in BIT 301. Each entry in BIT 301 may correspond to a particular branch instruction. A given entry in BIT 301 may also include a pointer to a corresponding entry in tBIT 303. Although only a single entry is depicted in BIT 301, it is noted that any suitable number of entries may be employed.

tBIT 303 may also include multiple entries, such as, entry 304, for example. In some embodiments, tBIT 303 may include 96 entries. Different portions of Branch instruction information 308 may be stored in a particular entry in tBIT 303. As described below in more detail, branch history information may be stored in a given entry in tBIT 303. Such branch history information may be stored in response to a determination a prediction indicates that a branch associated with a current instruction will be taken. If it is determined that a branch associated with the branch instruction was actually taken upon execution of the branch instruction, the branch history information may also be stored in an entry in tBIT 303 even though it was mispredicted as not being taken. When data is stored in an entry in tBIT 303, an index value may be added to a corresponding entry in BIT 301 that points to the entry in tBIT 303. By storing branch history information for only branches that are taken, the overall storage requirements for storing branch information may be reduced, thereby saving area and power, in some embodiments.

Both BIT 301 and tBIT 303 may be designed according to one of various design styles. For example, in some embodiments, BIT 301 and tBIT 303 may each include a register file, which include multiple latches, flip-flop, or other suitable storage circuits, each configured to store a single data bit. In various embodiments, the storage circuits may by dual-ported providing separate ports for storing and retrieving data from the storage circuits. Pointers 306 and 307 may be used, in some embodiments, to connect specific groups of storage circuits to common data input and output lines. It is noted that register files may be used in a particular embodiment, and that, in other embodiments, any suitable memory circuit may be employed.

In some embodiments, BIT 301 and tBIT 303 may have multiple read ports, each of which may be used in conjunction with different pipelines within an execution unit. The data retrieved through the read ports may be used to restore the respective histories of the Branch Direction Predictor (BDP) and Branch Target Predictor (BTP). Other read ports may be used to retrieve data in BIT 301 and tBIT 303 to train the BDP or the Return Address Stack (RAS). A separate read port may be used when a given branch is ready to retire and the BDP needs to be trained.

Circuitry 305 may be configured to generate pointers 306 and 307, which are coupled to BIT 301 and tBIT 303, respectively. It is noted that, in various embodiments, pointers 306 and 307 may each include multiple pointers used to read and write their respective tables. As described above, multiple read pointers may be used to retrieve information from BIT 301 and tBIT 303 to send to front-end instruction fetch and branch prediction circuits. Write pointers may point to entry which should be used to store data relating to a new branch instruction. Retire pointers may be employed to indicate the next branch to retire. Additionally, training pointers may be used to indicate the next branch that needs to be trained in the BDP or RAS. It is noted that when no further free entries are available in BIT 301 and tBIT 303, Circuitry 305 may reuse previous pointer values allowing previously used entries to be re-used for new data.

Circuitry 305 may be designed according to several design styles. In various embodiments, Circuitry 305 may include multiple static logic gates coupled together to perform the desired logic function. Alternatively, or additionally, Circuitry 305 may include one or more state elements, allowing Circuitry 305 to function as a sequential logic circuit or state machine.

It is noted that the embodiment illustrated in FIG. 3 is merely an example. In other embodiments, different circuit blocks and different configurations of circuit blocks may be employed.

Turning to FIG. 4, a table illustrating data stored in a BIT, such as, BIT 301, is depicted. A BIT may be separated into different sections (referred to herein as "slices"), each of which may correspond to a particular type of branch instruction. Within each slice, different fields may store different information.

In the present embodiment, Slice 0 is used for all types of branches and includes 4 different fields. TBITTIDX may include a pointer to a corresponding entry in a tBIT as described above. BPADDRLO may include a branch address, while BDPTAKEN may indicate if the corresponding branch was predicted to be taken.

When a particular branch involves the use of a Branch Detection Predictor (BDP), additional information may be stored in slice 1 fields. For example, BSPADDRHI includes different bits of the branch address, and BDPUPDU may indicate if the corresponding branch will update "U-bits" used in the training of the BDP.

It is noted that the table depicted in FIG. 4 is merely an example. In other embodiments, different fields and different organization of slices may be employed.

Just as different types of branches store different information in a BIT, different types of branches may store different information in a tBIT. A table depicting an embodiment of data storage in a tBIT, such as, e.g., tBIT 303, is illustrated in FIG. 5.

The fields included in slice 0 may be used to store data for branches using the Branch Target Predictor (BTP). As depicted in the table illustrated in FIG. 5, the fields include information specifying the BTP hit table index, U-bits for BTP tables, a counter bit for the BTP hit table, and the fetch group program counter value for the BTP branch. It is noted that, in some embodiments, slice 0 of a tBIT may a logical slice and may share the physical storage of slice 1 of a BIT.

Slice 1 in the tBIT may be used for all types of branches and may store branch target path history (GHIST) and branch address path history (PHIST) values for the BDP. In various embodiments, the GHIST value may be updated for each taken branch by shifting the old history left by one bit and the performing an exclusive-OR (XOR) operation using the target of every taken branch, excluding the bottom bits.

The PHIST value, in some embodiments, may be updated by shifting the old PHIST value left by one bit and the performing an XOR operation on the shifted value and 4-bits of the branch address. By employing a different method for generating the PHIST values, more useful information is available when performing a lookup in the BDP tables.

In the present embodiment, slice 2 includes information for function calls and returns. Specifically, slice 2 stores information for the Return Address Stack (RAS) pop branch, the age of a RAS branch, and the RAS pop pointer.

It is noted that the embodiment illustrated in FIG. 5 is merely an example. In other embodiments, different numbers of slices and different fields within a given slice are possible and contemplated.

Figure 6:
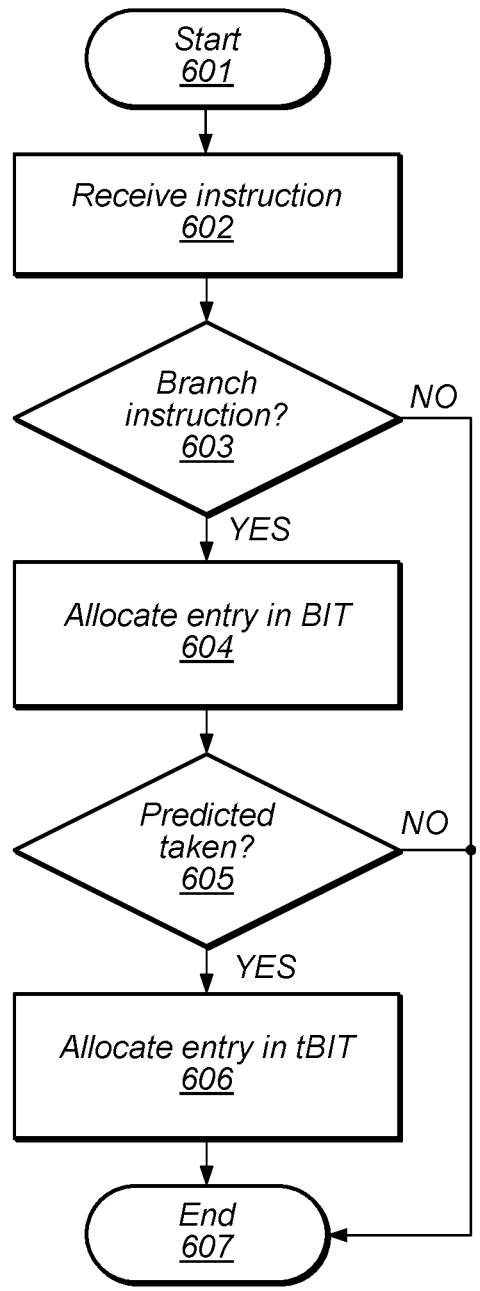
FIG. 6 illustrates a flow diagram depicting an embodiment of a method for storing information in a Branch Information Unit.

Turning to FIG. 6, a flow diagram depicting an embodiment of method for allocating entries in a BIU is illustrated. Referring collectively to the embodiment of FIG. 3, along with the flow diagram of FIG. 6, the method begins in block 601. BIU 300 may then receive an instruction 602. In various embodiments, IFU 210 may perform at least a partial decode of the instruction to determine whether the instruction is a branch instruction. Information indicating if the instruction is a branch instruction to BIU 300. The method may then depend on whether the instruction is a branch instruction (block 603).

If the instruction is not a branch instruction, then the method may conclude in block 607. Alternatively, if the instruction is a branch instruction, then an entry may be allocated in BIT 301 (block 604). In various embodiments, Circuitry 306 may adjust pointer 306 to allow Branch instruction information 308 to be written in a particular entry of BIT 301, such as, entry 302, for example. The method may then depend on a prediction associated with the branch instruction (block 605).

When a branch instruction is detected, a branch predictor, such as, e.g., Branch Predictor 280, may generate a prediction as to whether the branch included in the instruction is taken or not taken. Based on the prediction, further instructions are fetched along the predicted program path. In the case when it is predicted that the branch will not be taken, the method may conclude in block 605.

If, however, it is predicted that the branch will be taken, then an entry may be allocated in tBIT 302 (block 606). Circuitry 306 may adjust pointer 307 to allow Branch instruction information 308 to be written into a particular entry of tBIT 303, such as, entry 304, for example. In various embodiments, branch history information may be stored in the particular entry of tBIT 303. Additionally, an index indicating in which entry in tBIT 303 the branch history information is stored may be added to the corresponding entry in BIT 301. It is noted that by storing branch history information in tBIT 303 for branch instructions that have been predicted to be taken, the size of BIT 301 may be reduced, saving area and power. Once the branch history information has been stored in tBIT 303, then method may conclude in block 607.

It is noted that the method depicted in the flow diagram of FIG. 6 is merely an example. In other embodiments, different operations and different orders of operations are possible and contemplated.

After information relating to a particular branch instruction has been stored in branch information tables, such as BIT 301 and tBIT 302, the particular branch instruction may continue through the pipelines of the processor or processor core. Upon reaching an execution unit, such as, e.g., one of Execution units 230 as illustrated in FIG. 2, the particular branch instruction may be executed. Once the particular branch instruction has been executed, the accuracy of the prediction regarding whether the branch included in the instruction was to be taken or not taken, may be determined.

Figure 7:
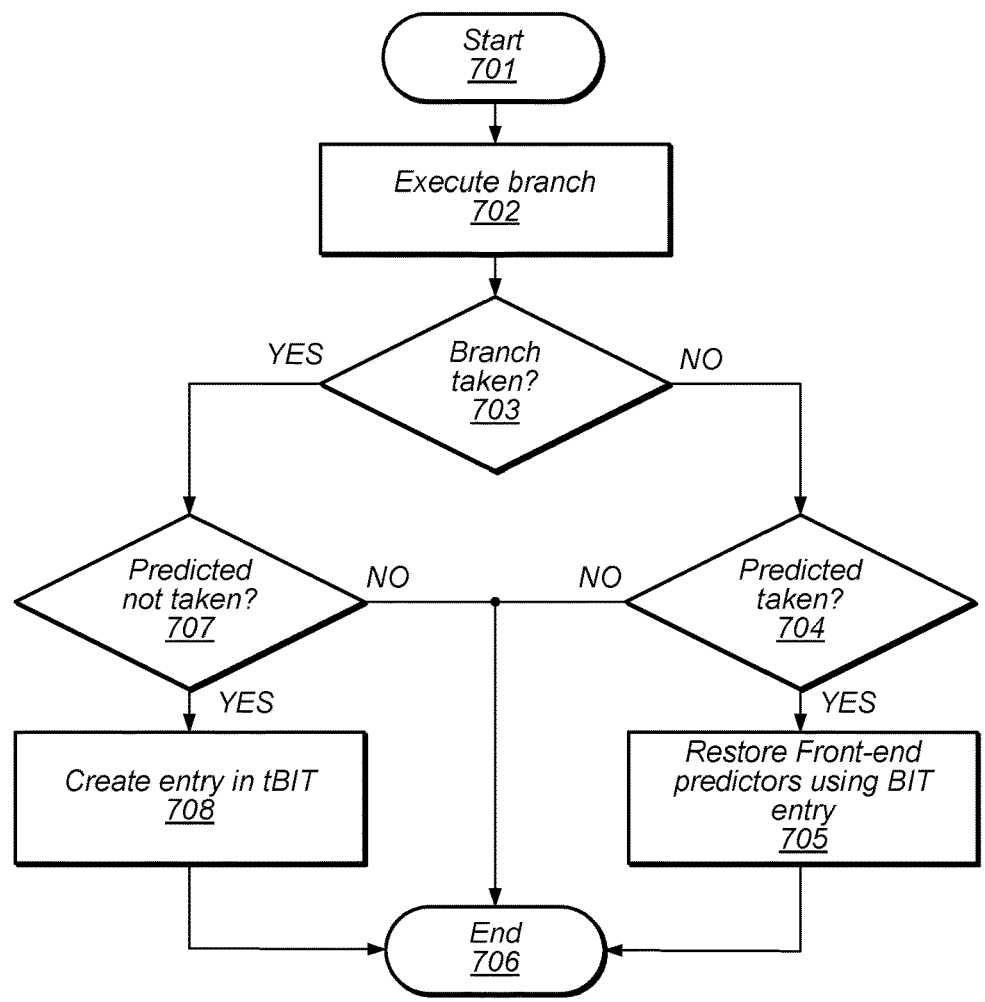
FIG. 7 illustrates a flow diagram depicting an embodiment of a method for using a Branch Information Unit.

A flow diagram depicting an embodiment of a method for utilizing a BIU once a branch instruction has been executed is illustrated in FIG. 7. Referring collectively to the embodiment of FIG. 3, and the flow diagram of FIG. 7, the method begins in block 701. A branch instruction may then be executed (block 702). In various embodiments, a particular execution unit, such as, e.g., one of Execution units 230, included within a processor or processor core may execute the branch instruction. The method may then depend on if the branch is taken or not taken (block 703).

If the branch was actually taken, then the method may depend on if the branch was predicted as not taken (block 707). If the branch was not predicted as not taken, then the method may conclude in block 706. Alternatively, if the branch was predicted as being taken, then an entry will be allocated in tBIT 303. As described above, the entry allocated in tBIT 303 may correspond to an existing entry in BIT 301, and the existing entry in BIT 301 may be update with an index indicating the location of the newly allocated entry in tBIT 303. Branch history information associated with the branch instruction may be stored in the newly allocated entry in tBIT 303. In various embodiments, pointer 307 may be updated in order to store data in the entry in tBIT 303. Once the data has been stored in tBIT 303, the method may conclude in block 706.

Alternatively, if the branch was not actually taken, the method may then depend on if the branch was predicted to be taken (block 704). If the branch was predicted to not be taken, then the method may conclude in block 706. If, however, the branch was predicted to be taken, then the front-end predictors may be restored using information in the BIU (block 705). Information may be read from BIT 301 corresponding the executed branch instruction. In various embodiments, Circuitry 305 may maintain pointer 306 so that the entry corresponding to the executed branch instruction may be read. An index to a particular entry in tBIT 303 may be included in the information read from BIT 301. The index may then be used to retrieve branch history information from tBIT 303. Such information may be used by the instruction fetch unit and/or the branch prediction unit to reset fetching and prediction to the path not taken. Once the branch history information has been retrieved from tBIT 303, the method may conclude in block 706. In some embodiments, Circuitry 305 may maintain pointers for entries in both BIT 301 and tBIT 303. In such cases, branch history information may be retrieved from both BIT 301 and tBIT 303 in parallel in order to reset fetching and prediction to the path not taken.

It is noted that the embodiment of the method depicted in the flow diagram of FIG. 7 is merely an example. In other embodiments, the operations may be performed in different orders than the order depicted in the flow diagram of FIG. 7.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a first memory configured to store a first table including a first plurality of entries, wherein a particular entry of the first plurality of entries corresponds to a given branch instruction and includes at least a branch address and an indication if the given branch instruction was predicted to be taken;
    a second memory configured to store a second table including a second plurality of entries; and
    circuitry configured to:
        store first data associated with an instruction in a first entry of the first plurality of entries in response to a determination that the instruction is a branch instruction;
        store second data in a second entry of the second plurality of entries in response to a determination that a prediction indicates that a branch associated with the instruction will be taken, wherein the second data includes a branch history associated with the branch; and
        update the first entry to include an index to the second entry in response to the determination that the prediction indicates that the branch associated with the instruction will be taken.

2. The apparatus of claim 1, wherein the circuitry is further configured to store third data in third entry of the second plurality of entries in response to a determination that, upon execution, the branch associated with the instruction is taken and a determination that the prediction indicates that the instruction would not be taken.

3. The apparatus of claim 1, wherein the circuitry is further configured to retrieve the second data from the second entry in response to a determination that, upon execution, the branch associated with the instruction is not taken and the determination that the prediction indicates that the branch associated with the instruction would be taken.

4. The apparatus of claim 1, wherein to store the first data in the first entry, the circuitry is further configured to increment a first pointer, wherein the first pointer includes data indicative of a particular entry of the first plurality of entries.

5. The apparatus of claim 1, wherein the first memory includes a first register file, and the second memory includes a second register file.

6. The apparatus of claim 1, wherein the first data includes a portion of a branch address value corresponding to the instruction.

7. A method, comprising:
    fetching an instruction;

storing first data associated with the instruction in a first entry of a first plurality of entries including in a first table, in response to determining that the instruction is a branch instruction, wherein a particular entry of the first plurality of entries corresponds to a given branch instruction and includes at least a branch address and an indication if the given branch instruction was predicted to be taken;

storing second data in a second entry of a second plurality of entries included in a second table, in response to a determination that a prediction indicates that a branch associated with the instruction will be taken, wherein the second data includes a branch history associated with the branch; and updating the first entry to include an index to the second entry in response to the determining that the prediction indicates that the branch associated with the instruction will be taken.

8. The method of claim 7, further comprising storing third data in third entry in the second table in response to determining that, upon execution, the branch associated with the instruction is taken and determining that the branch was mispredicted as being not taken.

9. The method of claim 7, further comprising retrieving the second data from the second table in response to determining that, upon execution, the branch associated with the instruction is not taken and determining that the branch was mispredicted as taken.

10. The method of claim 9, further comprising retrieving the second data from the second table using the index.

11. The method of claim 7, wherein the first data includes a target address for the branch associated with the instruction.

12. The method of claim 7, wherein the second data is further based on a hash of branch targets for one or more previously taken branches.

13. The method of claim 7, wherein the first data includes a portion of a branch address value corresponding to the instruction.

14. A system, comprising:
a memory; and
a processor including a first table and a second table, wherein the processor is configured to:
fetch an instruction from the memory;
store first data associated with the instruction in the first table in response to a determination the instruction is a branch instruction;
store second data in the second table in response to a determination that a prediction indicates that a branch associated with the instruction will be taken, wherein the second data includes a branch history associated with the branch; and
update the first data to include an index to the second data in response to the determination that the prediction indicates that the branch associated with the instruction will be taken.

15. The system of claim 14, wherein the processor is further configured to store third data in third entry in the second table in response to a determination that, upon execution, the branch associated with the instruction is taken and a determination that the branch was mispredicted as being not taken.

16. The system of claim 14, wherein the processor is further configured to retrieve the second data from the second table in response to a determination that, upon execution, the branch associated with the instruction is not taken and a determination that the branch was mispredicted as taken.

17. The system of claim 16, wherein to retrieve the second data from the second table, the processor is further configured to retrieve the first data from the first table and retrieve the second data using the index.

18. The system of claim 14, wherein the first data includes a portion of a branch address value associated with the instruction.

19. The system of claim 14, wherein the first data includes a target address for the branch associated with the instruction.

20. The system of claim 14, wherein the second data is further based on a hash of branch targets for one or more previously taken branches.

* * * * *